United States Patent
Qu et al.

(10) Patent No.: US 9,730,200 B2
(45) Date of Patent: Aug. 8, 2017

(54) SYSTEM AND METHOD FOR TRANSMISSION AND RECEPTION OF CONTROL CHANNELS

(75) Inventors: Bingyu Qu, Schaumburg, IL (US);
Philippe Sartori, Algonquin, IL (US);
Weimin Xiao, Rolling Meadows, IL (US); Brian Classon, Palatine, IL (US);
Vipul Desai, Palatine, IL (US)

(73) Assignee: Futurewei Technologies, Inc., Plano, TX (US)

( * ) Notice: Subject to any disclaimer, the term of this patent is extended or adjusted under 35 U.S.C. 154(b) by 94 days.

(21) Appl. No.: 13/436,657

(22) Filed: Mar. 30, 2012

(65) Prior Publication Data

US 2012/0250642 A1 Oct. 4, 2012

Related U.S. Application Data

(60) Provisional application No. 61/471,061, filed on Apr. 1, 2011, provisional application No. 61/470,940, filed
(Continued)

(51) Int. Cl.
*H04W 72/04* (2009.01)
*H04W 24/10* (2009.01)
*H04W 48/12* (2009.01)

(52) U.S. Cl.
CPC ......... *H04W 72/042* (2013.01); *H04W 24/10* (2013.01); *H04W 48/12* (2013.01); *H04W 72/0406* (2013.01)

(58) Field of Classification Search
CPC ............... H04W 72/042; H04W 24/10; H04W 72/0406; H04W 72/0413; H04W 72/082;
(Continued)

(56) References Cited

U.S. PATENT DOCUMENTS 8,204,512 B2  6/2012  Dietrich et al.
8,433,251 B2  4/2013  Chen et al.
(Continued)

FOREIGN PATENT DOCUMENTS

CN   101589582 A   11/2009
CN   101626625 A   1/2010
(Continued)

OTHER PUBLICATIONS

"3rd Generation Partnership Project; Technical Specification Group Radio Access Network; Evolved Universal Terrestrial Radio Access (E-UTRA); Physical layer for relaying operation (Release 10)," 3GPP TS 36.216, V10.1.0, Dec. 2010, 15 pages.
(Continued)

*Primary Examiner* — Charles C Jiang
*Assistant Examiner* — Oussama Roudani
(74) *Attorney, Agent, or Firm* — Slater Matsil, LLP

(57) ABSTRACT

A method for transmitting control information to a wireless node includes determining, by a communications controller, a first resource assignment parameter according to a pseudo-random sequence derived from an identifier, and mapping, by the communications controller, using the first resource assignment parameter, a demodulation reference signal associated with the wireless node onto a first resource located in a data region of a subframe. The method also includes mapping, by the communications controller, modulated control information associated with the wireless node onto a second resource located in the data region of the subframe, and transmitting, by the communications controller, the subframe to the wireless node.

27 Claims, 13 Drawing Sheets

Related U.S. Application Data on Apr. 1, 2011, provisional application No. 61/471, 049, filed on Apr. 1, 2011, provisional application No. 61/471,055, filed on Apr. 1, 2011.

(58) Field of Classification Search
CPC ... H04W 24/02; H04W 72/04; H04W 84/047; H04W 72/0426
USPC ....... 370/280, 239, 252, 328, 315, 312, 336, 370/331, 209, 210, 241, 330, 350; 455/423, 434, 501, 517, 522
See application file for complete search history.

(56) References Cited

U.S. PATENT DOCUMENTS

| | | |
|---|---|---|
| 8,441,996 B2 | 5/2013 | Kim et al. |
| 8,538,411 B2 | 9/2013 | Kwon et al. |
| 2008/0032632 A1 | 2/2008 | Choi et al. |
| 2008/0043678 A1 | 2/2008 | Taniguchi |
| 2008/0239977 A1 | 10/2008 | Xue et al. |
| 2009/0003274 A1 | 1/2009 | Kwak et al. |
| 2009/0088148 A1 | 4/2009 | Chung et al. |
| 2009/0161618 A1 | 6/2009 | Johansson et al. |
| 2010/0103901 A1 | 4/2010 | Miki et al. |
| 2010/0111226 A1 | 5/2010 | Ko et al. |
| 2010/0135273 A1 | 6/2010 | Kim |
| 2010/0177835 A1 | 7/2010 | Dounaev et al. |
| 2010/0246518 A1* | 9/2010 | Gheorghiu et al. ............ 370/329 |
| 2010/0254268 A1 | 10/2010 | Kim et al. |
| 2010/0303011 A1 | 12/2010 | Pan et al. |
| 2010/0317359 A1 | 12/2010 | Suga |
| 2010/0322135 A1 | 12/2010 | Van Lieshout et al. |
| 2010/0322154 A1 | 12/2010 | Chen et al. |
| 2011/0021228 A1 | 1/2011 | Kim et al. |
| 2011/0044391 A1 | 2/2011 | Ji et al. |
| 2011/0103295 A1* | 5/2011 | Khandekar et al. .......... 370/315 |
| 2011/0142000 A1 | 6/2011 | Han et al. |
| 2011/0158104 A1 | 6/2011 | Frenger et al. |
| 2011/0243090 A1 | 10/2011 | Grovlen et al. |
| 2011/0273996 A1 | 11/2011 | Kim et al. |
| 2011/0299490 A1 | 12/2011 | Nordstrom et al. |
| 2012/0063401 A1 | 3/2012 | Xue et al. |
| 2012/0069793 A1 | 3/2012 | Chung et al. |
| 2012/0082130 A1 | 4/2012 | Xue et al. |
| 2012/0113889 A1 | 5/2012 | Noh et al. |

FOREIGN PATENT DOCUMENTS

| | | |
|---|---|---|
| CN | 101682406 A | 3/2010 |
| CN | 101682419 A | 3/2010 |
| CN | 101868003 A | 10/2010 |
| CN | 101868033 A | 10/2010 |
| CN | 101908955 A | 12/2010 |
| CN | 101932077 A | 12/2010 |
| EP | 1681790 B1 | 5/2007 |
| EP | 2448146 A2 | 5/2012 |
| RU | 2391799 C2 | 6/2010 |
| WO | WO 2009/041779 A1 | 4/2009 |
| WO | 2010058245 A1 | 5/2010 |
| WO | WO 2010/070197 A1 | 6/2010 |
| WO | WO 2010/082877 A1 | 7/2010 |
| WO | 2010129605 A1 | 11/2010 |
| WO | 2010140748 A1 | 12/2010 |
| WO | 2010151086 A2 | 12/2010 |
| WO | WO 2010/145530 A1 | 12/2010 |
| WO | WO 2010/145532 A1 | 12/2010 |

OTHER PUBLICATIONS

"3$^{rd}$ Generation Partnership Project; Technical Specification Group Radio Access Network; Evolved Universal Terrestrial Radio Access (E-UTRA); Physical Channels and Modulation (Release 10)," 3GPP TS 36.211, V10.1.0, Mar. 2011, 103 pages.

"3$^{rd}$ Generation Partnership Project; Technical Specification Group Radio Access Network; Evolved Universal Terrestrial Radio Access (E-UTRA); Multiplexing and channel coding (Release 10)," 3GPP TS 36.212, V10.3.0, Sep. 2011, 79 pages.

"3$^{rd}$ Generation Partnership Project; Technical Specification Group Radio Access Network; Evolved Universal Terrestrial Radio Access (E-UTRA); Physical layer procedures (Release 10)," 3GPP TS 36.213, V10.3.0, Sep. 2011, 122 pages.

"3$^{rd}$ Generation Partnership Project; Technical Specification Group Radio Access Network; Evolved Universal Terrestrial Radio Access (E-UTRA); Physical layer for relaying operation (Release 10)," 3GPP TS 36.216, V10.3.1, Sep. 2011, 16 pages.

International Search Report received in Patent Cooperation Treaty Application No. PCT/CN2012/073461, mailed Jul. 12, 2012, 3 pages.

Written Opinion of the International Searching Authority received in Patent Cooperation Treaty Application No. PCT/CN2012/073461, mailed Jul. 12, 2012, 3 pages.

ASUSTeK, "PHICH resource allocation in LTE-A," 3GPP TSG RAN WG1 Meeting #60, R1-100994, Agenda Item: 7.1.2, Feb. 22-26, 2010, 3 pages.

"Extended Eurpoean Search Report," Application No. 12763491.3, mailing date: Apr. 1, 2014, 10 pages.

"International Search Report and Written Opinion," International Application No. PCT/CN2012/073473, Applicant: Huawei Technologies Co., Ltd., et al., mailing date: Jul. 12, 2012, 10 pages.

"International Search Report and Written Opinion," International Application No. PCT/CN2012/073466, Applicant: Huawei Technologies Co., Ltd., et al., mailing date: Jul. 5, 2012, 11 pages.

"International Search Report and Written Opinion," International Application No. PCT/CN2012/073474, Applicant: Huawei Technologies Co., Ltd., et al., mailing date: Jul. 5, 2012, 9 pages.

Change Request, R1-111217, 3GPP TSG-RAN1 Meeting #64, Taipei, Taiwan, Feb. 21-25, 2011, 12 pages.

Office Action received in European Application No. 12763491.3-1854 mailed Feb. 5, 2015, 8 pages.

Communication pursuant to Article 94(3) EPC received in Application No. 12763491.1-1854 mailed Jul. 21, 2015, 7 pages.

Russian Notice of Allowance received in Application No. 2013148797 mailed Sep. 1, 2015, 12 pages.

* cited by examiner

SYSTEM AND METHOD FOR TRANSMISSION AND RECEPTION OF CONTROL CHANNELS

This application claims the benefit of U.S. Provisional Applications: No. 61/471,049, filed on Apr. 1, 2011, entitled "System and Method for Signaling a Location of a Control Channel," No. 61/470,940, filed on Apr. 1, 2011, entitled "System and Method for Transmission and Reception of Control Channels in a Communications System," No. 61/471,055, filed on Apr. 1, 2011, entitled "System and Method for Transmission and Reception of Control Channels," and No. 61/471,061, filed on Apr. 1, 2011, entitled "System and Method for Transmission and Reception of Control Channels," which applications are hereby incorporated herein by reference.

CROSS-REFERENCE TO RELATED APPLICATIONS

This application is related to the following co-assigned patent applications: Ser. No. 13/434,449, filed Mar. 29, 2012, entitled "System and Method for Transmission and Reception of Control Channels in a Communications System"; Ser. No. 13/436,375, filed Mar. 30, 2012, entitled "System and Method for Signaling a Location of a Control Channel"; and Ser. No. 13/436,590, filed Mar. 30, 2012, entitled "System and Method for Transmitting and Receiving Control Channels" which applications are hereby incorporated herein by reference.

TECHNICAL FIELD

The present disclosure relates generally to digital communications, and more particularly to a system and method for transmission and reception of control channels.

BACKGROUND

Wireless telephony systems have traditionally been deployed using the concept of a cell, with one base station (BS) (also known as base transceiver station (BTS), Node B (NB), evolved NB (eNB), Access Point, communications controller, and the like) covering a given geographic area. BSs having the same or similar transmit power are typically used. In addition, in order to maximize coverage and to maintain interference at a reasonable level, careful site planning is used. A network deployed in such a manner is usually referred to as a homogenous network (HomoNet).

While such a deployment is optimal when the user density is uniform, in practice, it has serious shortcomings because the user density and traffic demand are rarely uniform. For example, in rural areas, roads are typically the only area where users are present. In urban or suburban areas, there are locations (hot spots) where the traffic demand is higher: such locations may comprise shopping malls, hotels, conference centers, and the like.

In order to improve coverage and user satisfaction, it may be advantageous to cover these hot spots of traffic demands with Low Power Nodes (LPNs). For instance, lower power base stations can be deployed to, e.g., cover lobbies of hotels, portions of shopping malls, and the like. The coverage of such a base station is referred to as a pico cell. When the base station transmit power is even lower, e.g., to cover a single residential unit, the coverage of such a base station is referred to as a femto cell. A network comprising regular base stations and pico cells and/or femto cells is referred to as a heterogeneous network (HetNet).

HetNets present new challenges to the deployment of a cellular system. In particular, the cellular layout may not be as regular as for a HomoNet since it is dependent on the hot spot locations. In particular, it may well happen that a LPN is located close to another base station. The close proximity can create a high level of interference for both user equipment (UE) (also known as mobile station (MS), terminal, user, subscriber, wireless node, and the like) and BSs.

In the Third Generation Partnership Project (3GPP) Long Term Evolution (LTE) Release-10 technical standards, transmissions from the BS comprise both data channels and control channels. The interference can affect both the data channels and control channels. While solutions exist to mitigate interference on the data channels, no such solution has been defined yet for the control channels.

SUMMARY OF THE DISCLOSURE

Example embodiments of the present disclosure which provide a system and method for transmission and reception of control channels.

In accordance with an example embodiment of the present disclosure, a method for transmitting control information to a wireless node is provided. The method includes determining, by a communications controller, a first resource assignment parameter according to a pseudo-random sequence derived from an identifier, and mapping, by the communications controller, using the first resource assignment parameter, a demodulation reference signal associated with the wireless node onto a first resource located in a data region of a subframe. The method also includes mapping, by the communications controller, modulated control information associated with the wireless node onto a second resource located in the data region of the subframe, and transmitting, by the communications controller, the subframe to the wireless node.

In accordance with another example embodiment of the present disclosure, a method for receiving control information is provided. The method includes receiving, by a wireless node, a subframe, and determining, by the wireless node, a first resource assignment parameter according to a pseudo-random sequence derived from an identifier. The method also includes determining, by the wireless node, using the first resource assignment parameter, a demodulation reference signal associated with the wireless node, the demodulation reference signal located in a first resource located in a data region of the subframe, and demodulating, by the wireless node, modulated control information using the demodulation reference signal to produce the control information, the modulated control information located in a second resource located in the data region.

In accordance with another example embodiment of the present disclosure, a communications controller is provided. The communications controller includes a processor, and a transmitter operatively coupled to the processor. The processor determines a first resource assignment parameter according to a pseudo-random sequence derived from an identifier, maps using the first resource assignment parameter, a demodulation reference signal associated with a wireless node onto a first resource located in a data region of a subframe, and maps modulated control information associated with the wireless node onto a second resource located in the data region of the subframe. The transmitter transmits the subframe to the wireless node.

In accordance with another example embodiment of the present disclosure, a wireless node is provided. The wireless node includes a receiver, and a processor operatively coupled to the receiver. The receiver receives a subframe. The processor determines a first resource assignment parameter according to a pseudo-random sequence derived from an identifier, determines using the first resource assignment parameter, a demodulation reference signal associated with the wireless node, the demodulation reference signal located in a first resource located in a data region of the subframe, and demodulates modulated control information using the demodulation reference signal to produce control information, the modulated control information located in a second resource located in the data region.

One advantage of an embodiment is that the use of resource assignment parameters provides orthogonality to control channels, permitting a larger number of control channels to be transmitted. The use of resource assignment parameters also enables the use of advanced transmission techniques.

A further advantage of an embodiment is that the resource assignment parameters are selected according to a pseudo-random sequence, which provides an additional degree of randomness, as well as not requiring a significant amount of coordination between communicating devices. Hence, communications overhead is reduced.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

Figure 1:
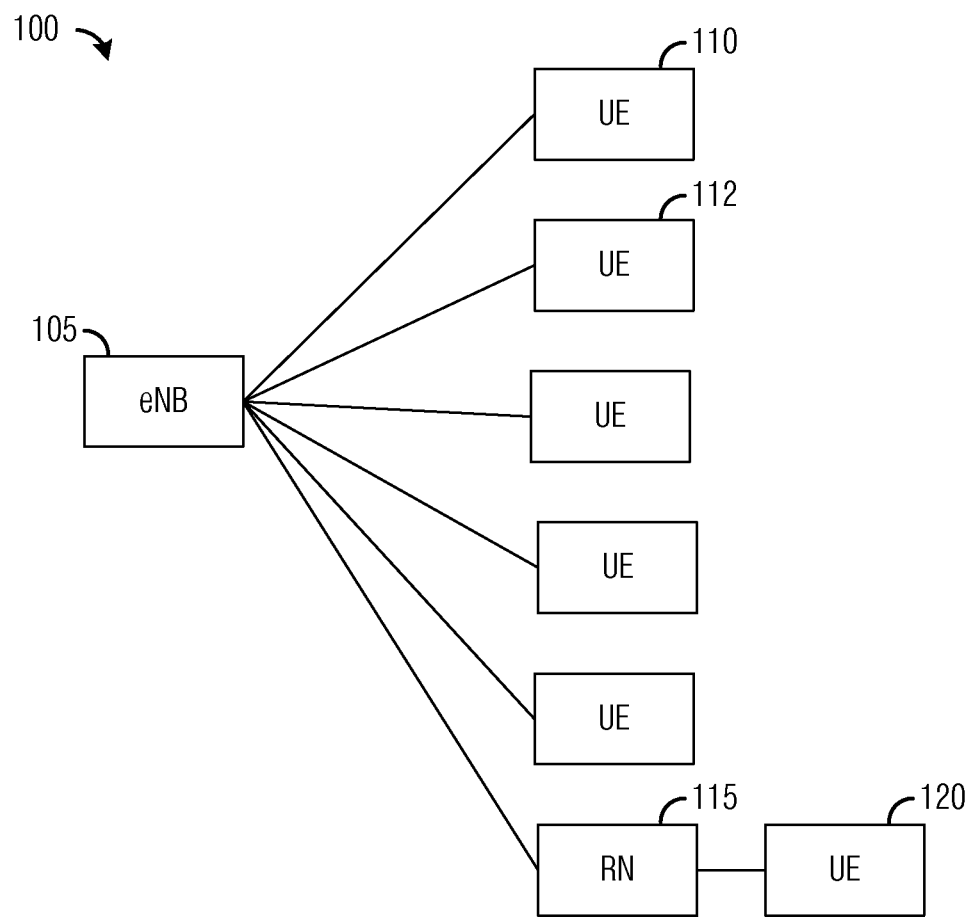
FIG. 1 illustrates an example communications system according to example embodiments described herein.

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to transmission and reception of control channels. For example, at an eNB, the eNB determines a resource assignment parameter according to a pseudo-random sequence that is derived from an identifier and then map a demodulation reference associated with the wireless node onto a first resource located in the data region of a subframe using the resource assignment parameter. The eNB also maps modulated control information associated with the wireless node onto a second resource in the data region of the subframe and transmits the subframe.

The present disclosure will be described with respect to example embodiments in a specific context, namely a HetNet deployment including a 3GPP LTE compliant communications system. The disclosure may also be applied, however, to other HetNet deployments, such as those including 3GPP LTE-Advanced, WiMAX, and the like, compliant communications systems, as well as HetNet deployments with non-standards compliant communications systems.

For 3GPP LTE Release 10 (Release-10) and earlier technical standards, both a Physical Downlink Control Channel (PDCCH) and a Physical Downlink Shared Channel (PDSCH) are defined. The PDSCH may be used to carry data information. The PDCCH may convey control information about a particular PDSCH, such as resource allocation information, modulation and coding information, and information about a Physical Uplink Shared Channel (PUSCH). The PDCCH may be considered to be a first type of control channel. For brevity, the control information for PDSCH and PUSCH can be referred as resource allocation information.

The PDCCH may be located in the first several symbols (e.g., one to four symbols) of a subframe. These PDCCH-bearing symbols may be referred to as a control domain or a control region. Other symbols in the subframe may be used for data transmission, and may be referred to herein as a data domain or a data region. Hence the PDCCH is located in control region while the PDSCH is located in data region.

In the control region, there may be other control channels, such as a Physical Hybrid Indicator Channel (PHICH), which is used to transmit ACK/NACK in response to uplink data transmission, and the Physical Control Format Indicator Channel (PCFICH), which is used to indicate the number of symbols of a control region in a subframe.

In 3GPP LTE Release-11 (LTE-A) or beyond technical standards, an eNB locates a new type of control channel(s), which may be located in the data region, control region, or both of a subframe may be considered. More specifically, when the control channel is located in the data region, a second control region may be defined and uses a portion of the data region. The second control region comprising some combination of time and frequency resources, e.g., resource elements, with a group of resource elements forming a resource block (RB). For example, in one 3GPP LTE configuration, 84 resource elements make up a RB. Similarly, a group of resource elements forms a control channel element (CCE). For example, in one 3GPP LTE configuration, 36 resource elements make up a control channel element. At least part of the time and frequency resources (or simply, resources) of the second control region may be used for transmitting control information in the new type of control channel, e.g., a second type of control channel. The resources of the second control region that are not used for transmitting control information may be used for other purposes, such as transmitting data, e.g., on the PDSCH.

One or more resource elements or parts of resource blocks (RBs) from the data region may be allocated for the second control region. As an example, a new second type control channel, a UE Physical Downlink Control Channel (U-PDCCH), may be located in the second control region of the data region (or the control region or both the data region and the control region), and may carry control information for a PDSCH channel or control information for a PUSCH channel. The second channel may carry resource assignments for UEs or other network nodes such as relay nodes. Additionally, the second control region may carry channels analogous to those carried in the first control region, such as the physical hybrid automatic repeat requested indicator channel (PHICH), and the like. A prefix of "U-" may be added to indicate the analogous channel in the second control region, such as the "U-PHICH". Collectively, information carried in these control channels, such as resource assignments (also commonly referred to as resource allocation assignments), configuration information, power control, codebook information, HARQ information, and the like, may be referred to as control information. The format and content of these analogous channels may be different from the first control region.

In addition to the first type of control channel and the second type of control channel, there may be other control channel types, including a third type of control channel, which may be transmitted in both the first control region and in the second control region. The information in the two control regions may be the same or it may be different.

FIG. 1 illustrates a communications system 100. Communications system 100 includes an evolved NodeB (eNB) 105, which may also be commonly referred to as a controller, a communications controller, a base station, a NodeB, and the like. Communications system 100 also includes a plurality of User Equipment (UE), such as UE 110, 112, and 120. A UE may also be commonly referred to as a mobile, mobile station, subscriber, user, terminal, wireless node, and the like. In addition, the communication system may include other entities such as Relay Node (RN) 115. The RN may serve one or more UEs, such as UE 120.

Communications between eNB 105 and a given UE may occur over a link that comprises a Un downlink (DL) channel and an Un uplink (UL) channel. UEs not directly served by the RN and RNs may be multiplexed together using and may be allocated different RBs. For 3GPP LTE Release-10, the UE resource assignments are transmitted on the PDCCH.

While it is understood that communications systems may employ multiple eNBs capable of communicating with a number of UEs, only one eNB, a plurality of UEs, and one RN are illustrated for simplicity.

Figure 2A:
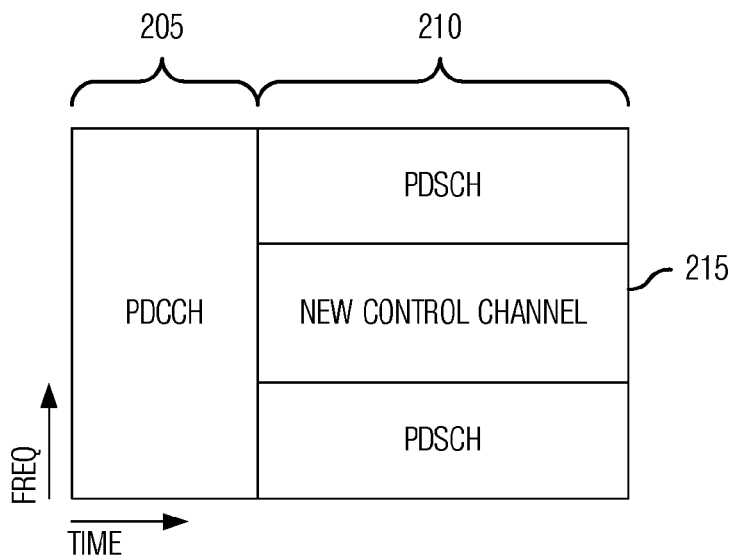
FIGS. 2a through 2d illustrate example subframes according to example embodiments described herein.

FIG. 2a illustrates a first subframe 200. Subframe 200 comprises a first control region 205 and a data region 210. Subframe 200 shows an example for a multicarrier modulation system. As discussed above, first control region 205 may include control signaling, such as a PDCCH, while data region 210 may include data as well as control signaling, which may include a PDSCH, as well as new control channels, such as a U-PHICH or a U-PDCCH.

First control region 205 may also be called a PDCCH control region and may contain the first type of control channels. The new control channels (e.g., the second type of control channels) are located in a new control region 215 (also commonly referred to as a second control region 215), which may be inside data region 210. New control region 215 can also be called the U-PDCCH control region. Although data region 210 may be used to transmit data, no data is shown in FIG. 2a. As shown in FIG. 2a, second control region 215 is located in data region 210, while PDCCH is located in first control region 205.

The representation of the various channels and regions in FIG. 2a is logical in nature with no direct relationship to an actual mapping of specific physical resources. In particular, the resources comprising second control region 215 may be distributed in frequency and are not restricted to be contiguous in frequency. Second control region 215 may also be time multiplexed with data, and for instance, may occupy only the first or the second slot of a subframe. In addition, second control region 215 may not necessarily start immediately after first control region 205, but may be offset by one or more symbols. Second control region 215 may consist of Physical RBs (PRBs) or Virtual RBs (VRBs), either localized or distributed. The PRBs and the VRBs comprise a plurality of resource elements.

Figure 2B:
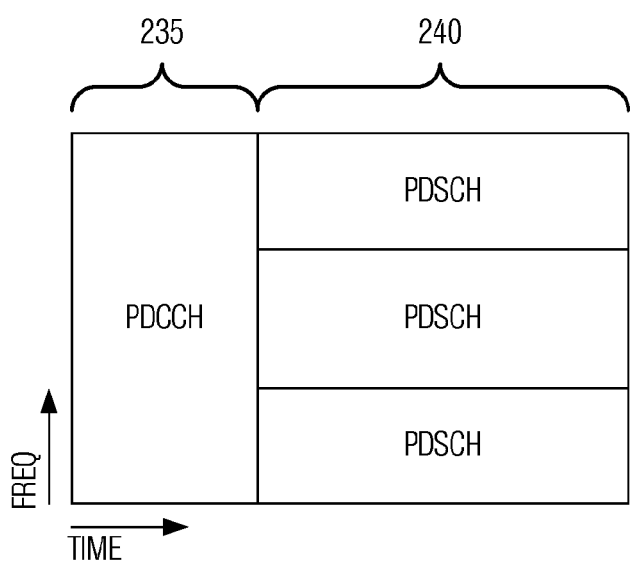

FIG. 2b illustrates a second subframe 230. Subframe 230 comprises a first control region 235 and a data region 240. As discussed above, first control region 235 may include control signaling, such as a PDCCH, while data region 240 may include data without control signaling. First control region 235 may also be called a PDCCH control region.

Figure 2C:
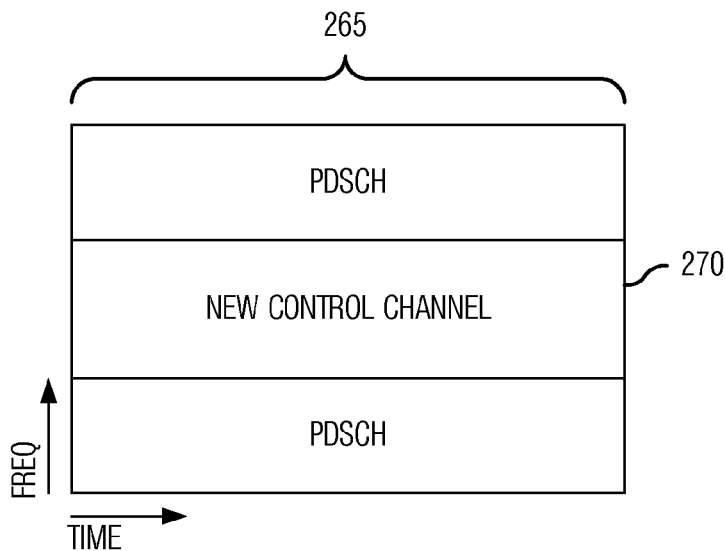

FIG. 2c illustrates a third subframe 260. Subframe 260 comprises a data region 265. As discussed above, data region 265 may include data as well as control signaling, which may include a PDSCH, as well as new control channels, such as a U-PDCCH or a U-PHICH. The new control channels are located in a new control region 270, which may be inside data region 265. New control region 270 may be used to transmit data, but no data is shown in FIG. 2c. As shown in FIG. 2c, new control region 270 is located in data region 265. It is noted that subframe 260 has no PDCCH since a first control region is absent.

Figure 2D:
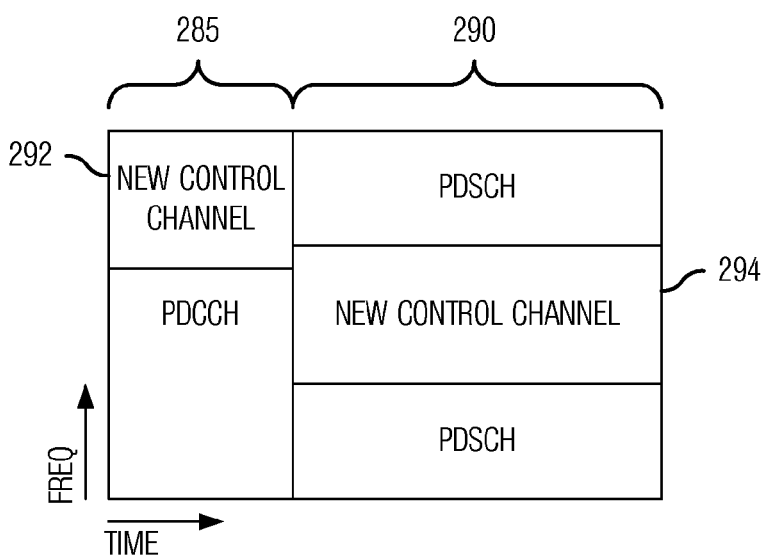

FIG. 2d illustrates a fourth subframe 280. Subframe 280 comprises a control region 285 and a data region 290. As discussed above, control region 285 may include control signaling, while data region 290 may include data as well as control signaling. The new control channel may be located in a first new control region 292, which may be inside control region 285, as well as in a second new control region 294, which may be inside data region 290.

As discussed previously, a relay PDCCH (R-PDCCH) may be used to transmit control information to notify RNs of the DL and/or UL grants on the link between the eNB 105 and the RN 115. However, the design of the R-PDCCH does not account for some unique properties of the access link between the eNB and the UE such as:

a) The mobility of a UE, as compared to a typically fixed RN.

b) The number of UEs associated with a cell can typically be much larger that the number of RNs in a cell.

There may be some benefits of having a U-PDCCH. As an example, different cells may allocate orthogonal resources for the U-PDCCH, thus the interference between U-PDCCHs of different cells can be significantly lowered. Another benefit may be that a dedicated reference signal, such as a demodulation reference signal (DMRS), can be used with the U-PDCCH, in other words, each U-PDCCH can have its own reference signal for channel estimation during demodulation, thereby allowing more advanced transmission schemes, such as beam forming or precoding, to be used.

The use of the DMRS may also create a more efficient control channel that can take advantage of technologies such as dynamic link adaptation, frequency selective resource allocation, and Multiple Input, Multiple Output (MIMO) transmission. Some of these improvements may also be used with the PDCCH (e.g., link adaptation), but some, e.g., Multi-User MIMO (MU-MIMO), is better suited for U-PDCCH.

Hence a more efficient design of the control channel may be needed required to reduce overhead and ensure performance. The design of the U-PDCCH should consider the details of multiplexing. In order to facilitate multiplexing, the U-PDCCH should be considered using RBs within the data region since the PDSCH is assigned in units of RBs, or more specifically in RB pairs where one element (RB) of the RB pair is mapped to the first slot of a subframe while another element is mapped to the second slot of a subframe. The number and location of available REs in each RB are determined after considering the size of the PDCCH control region and the control signaling overhead, e.g., reference symbols, primary synchronization signal (PSS), secondary synchronization signal (SSS), physical broadcast channel (PBCH), and the like.

Figure 3:
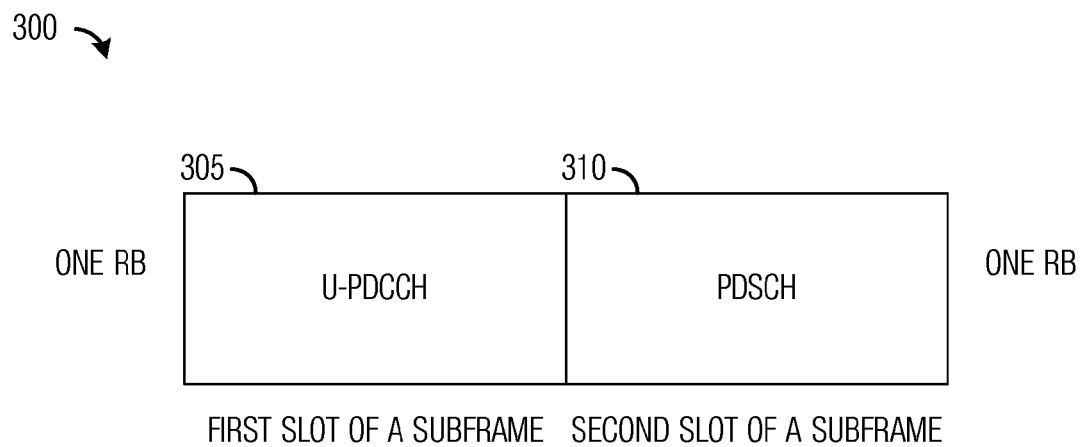
FIG. 3 illustrates an example a RB pair used to carry a U-PDCCH and a PDSCH according to example embodiments described herein.

FIG. 3 illustrates a RB pair 300 used to carry a U-PDCCH and a PDSCH. RB pair 300 shows an example embodiment wherein a U-PDCCH may occupy a first slot 305 in a subframe and a PDSCH may occupy a second slot 310 in the subframe. The two RBs in a subframe may be referred to as a RB pair.

The U-PDCCH may be multiplexed with other channels. As an example, the U-PDCCH may be multiplexed with U-PDCCH of other UEs. It may be possible to multiplex multiple U-PDCCHs through spatial multiplexing, with each U-PDCCH using different antenna port(s) for DMRS. As another example, the U-PDCCH may also be multiplexed with the R-PDCCH of a relay node. As yet another example, the U-PDCCH may also be multiplexed with the PDSCH of the same or other UEs since the U-PDCCH can have the same structure as the PDSCH. However, alignment of the U-PDCCH and the PDSCH being multiplexed may be needed.

The U-PDCCH may be multiplexed with the PDSCH. When, e.g., high order modulation (such as 16-QAM (quadrature amplitude modulation)) is used on the U-PDCCH or when a low aggregation level (i.e., a high code rate) is used, there may be a situation where the U-PDCCH occupies less than one RB, which may lead to inefficient utilization of the RB. Several solutions to rectify this situation are possible:

Several U-PDCCHs may be multiplexed together (in time and frequency domain) within the same RB and apply rate matching to fully occupy all assigned RBs.

The U-PDCCH may be multiplexed with a PDSCH as described below.

With a U-PDCCH and a PDSCH multiplexed together in a RB or a RB pair, a UE receiving the RB or the RB pair may need to process the information contained therein. As an example, when multiplexing a U-PDCCH and a PDSCH together, a RB or a RB pair can contain both the U-PDCCH and PDSCH. To enable the reuse of the DMRS of U-PDCCH for PDSCH, the U-PDCCH and PDSCH should belong to the same UE.

Figure 4:
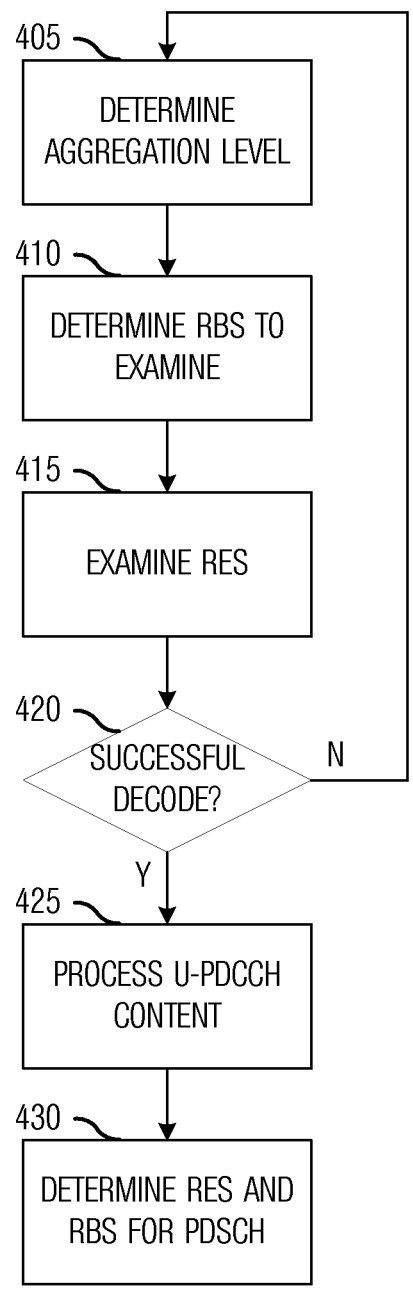
FIG. 4 illustrates an example flow diagram of UE operations in processing an RB comprising a U-PDCCH and a PDSCH according to example embodiments described herein.

FIG. 4 illustrates a flow diagram of UE operations in processing a resource, e.g., a RB) comprising a U-PDCCH and a PDSCH. UE operations may be indicative of operations occurring in a UE, such as UE 110 and UE 120, as the UE processes a RB that includes a U-PDCCH and a PDSCH multiplexed together.

UE operations may begin with the UE determining an aggregation level (denoted "L") of the resource, e.g., the RB (block 405). The UE may determine the aggregation level by selecting an aggregation level from several different aggregation levels. As an example, the U-PDCCH may use one of the aggregation levels defined for a PDCCH, such as L=1, 2, 4, or 8. The UE may select 1, 2, 4, or 8 as the aggregation level.

The UE may determine the resources, e.g., the RBs, to examine according to the aggregation level (block 410). In general, the UE may be informed by the eNB a set of resources, e.g., a set of RBs, where control information may be sent. In addition, the eNB may inform the UE which resources, e.g., RBs, belong to a UE-specific search space and a common search space. It is noted for the U-PDCCH that some resources, e.g., RBs, in the UE-specific search space may also be in the common search space. There may be rules that state aggregation levels are used per search space. For example, with the PDCCH, the aggregation level for the common search space (in the control region) is restricted to L=4 and 8 while aggregation levels 1, 2, 4, and 8 are allowed in the UE-specific search space. A similar set of rules may be defined for the U-PDCCH.

The UE may examine a subset of resources, e.g., REs, of the resources, e.g., RBs, from block 410 (block 415). As an example, the subset of REs of the RBs may correspond to the U-PDCCH, in other words, the subset of REs may contain the U-PDCCH. The subset of REs of the RBs may or may not be a contiguous block of REs. However, in order to ensure good channel estimation performance, the REs corresponding to the U-PDCCH may be distributed (or interleaved) throughout the RBs according to a distribution rule or an interleaving rule.

The UE may perform a check to determine if it was successful in decoding the U-PDCCH (block 420). If the UE was not able to decode the U-PDCCH (as indicated by "N"), the UE may return to block 405 to select a different aggregation level (as an example, the U-PDCCH may use one of the aggregation levels defined for a PDCCH, such as L=1, 2, 4, or 8). As an alternative example, the UE may select another resource, such as a RB or RB pair, and then return to block 405 to select an aggregation level.

If the UE was able to decode the U-PDCCH on a partially occupied resource, such as a partially occupied RB or RB pair, (as indicated by "Y"), the UE may process the contents of the decoded U-PDCCH (block 425). As an example, the UE may process the contents of the decoded U-PDCCH to determine if the U-PDCCH was assigned to the UE. If the U-PDCCH was assigned to the UE, the UE may consider that some of the remaining resources (e.g., REs of the RB or RB pair not used to convey the U-PDCCH) may be used for a PDSCH (block 430). The UE may perform additional processing on the remaining resources, e.g., REs.

As another example, U-PDCCH may be multiplexed with PDSCH of the same or different UE in the spatial domain. The U-PDCCH and the PDSCH transmissions may use different DMRS if U-PDCCH and PDSCH belong to different UEs.

The U-PDCCH may be multiplexed with a R-PDCCH. Since the U-PDCCH and R-PDCCH have basically the same structure, they can be multiplexed together. However, if the R-PDCCH and U-PDCCH have different search spaces, there may be collisions between search spaces of the two channels. These collisions may be similar to collisions occurring between various PDCCHs in the PDCCH control region. If there is a collision, the collision may block an entire resource, e.g., a RB, over the subframe. Fortunately, in some cases, the collision problem may not be significant, e.g., when both the U-PDCCH and the R-PDCCH use DMRS, the search space basically consists of adjacent resources, such as adjacent RBs.

As an example, if a channel, such as a R-PDCCH uses DMRS and no interleaving, and then multiplexing can be achieved by fitting the R-PDCCH in between resources, such as RBs, used for U-PDCCH. As another example, if both channels (a U-PDCCH and a R-PDCCH) use interleaving, then the probability of collisions can be fairly high. However, the probability can be lowered by ensuring that UE-specific and RN-specific search spaces are sufficiently large. As yet another example, a U-PDCCH may be multiplexed with R-PDCCH in the spatial domain. The U-PDCCH and the R-PDCCH transmissions may then use different DMRS ports.

To increase the capacity of U-PDCCH, spatial multiplexing may be used for multiple U-PDCCHs. As an example, UE1 and UE2 may be allocated in the same resource for the U-PDCCH, but with different precoding vectors for multiple antennas. In addition, the U-PDCCH may be scrambled by a cell-specific scrambling code, and the DMRS may be generated also by a cell-specific scrambling code. Multiple DMRS may be orthogonal in time, frequency, and/or code domain, for example, orthogonal codes can be applied (modulated) to the DMRS symbols. Multiple DMRS patterns/ports may correspond to multiple antenna ports. In other words, the data transmitted on an antenna port has the same precoding vector as that of the reference signal of the same antenna port.

Although the discussion focuses on the use of DMRS to support the multiplexing of multiple control channels, such as multiple U-PDCCHs, multiple PDSCHs, multiple R-PDCCHs, and a combination thereof, by providing orthogonality, other resource assignment parameters, such as other reference signals, precoding vectors, antenna ports, antenna port number, orthogonal patterns, scrambling codes, and the like, may be used to support the multiplexing of multiple control channels. Therefore the discussion of DMRS as a resource assignment parameter should not be construed as being limiting to either the spirit or the scope of the examples discussed herein.

Figure 5A:
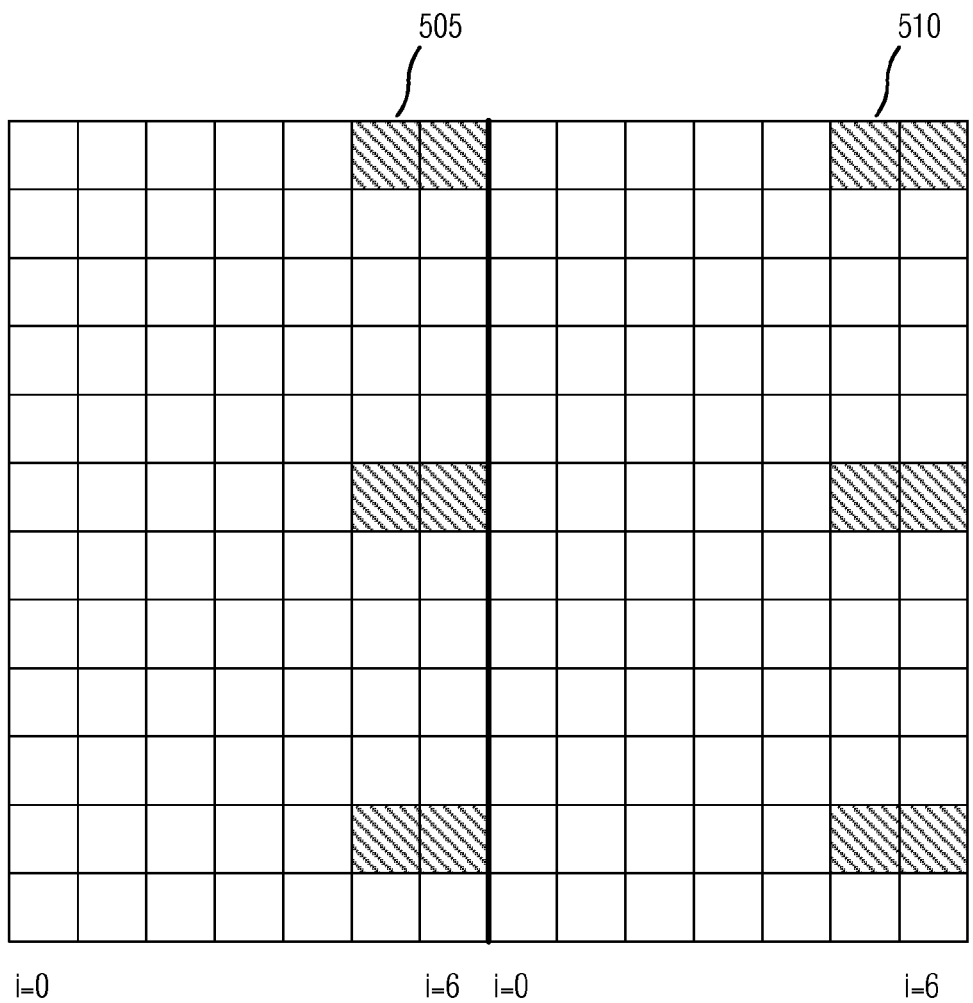
FIG. 5a illustrates a first example DMRS of a RB pair with 12 subcarriers in a subframe according to example embodiments described herein.
Figure 5B:
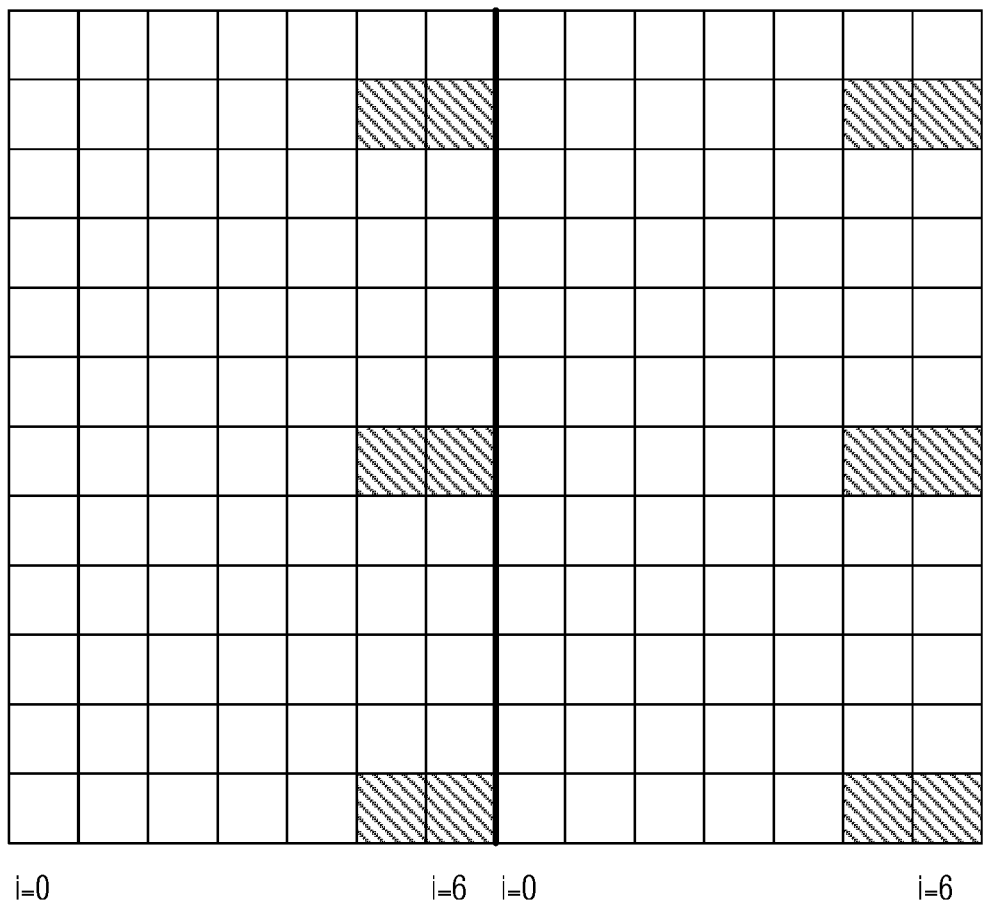
FIG. 5b illustrates a second example DMRS of a RB pair with 12 subcarriers in a subframe according to example embodiments described herein.

FIG. 5a illustrates a first example DMRS of a resource pair, such as a RB pair, with 12 subcarriers in a subframe. Cross-hatched boxes, such as boxes 505 and 510, illustrate REs used for a DMRS. FIG. 5b illustrates a second example DMRS of resource pair, such as a RB pair, with 12 subcarriers in a subframe. The two example DMRS are orthogonal in the time-frequency domain. In addition to being orthogonal in the time-frequency domain, code-division orthogonality can also be used to create additional DMRS patterns.

As an example, using two-length Walsh codes (1, 1), and (1, −1) modulated on the two REs in symbols 5 and 6 (utilizing zero-based numbering) of a slot of a subframe, results in two orthogonal DMRS patterns occupying the same resource as the pattern shown in FIG. 5a. Generally, if a four-length Walsh code modulated in time domain is used, there will be four orthogonal DMRS patterns with the same resource allocation. As specified in TS 36.211 of the 3GPP LTE standards, DMRS patterns of antenna ports 7 and 8 occupy the resources shown in FIG. 5a in case of a normal subframe for a normal cyclic prefix. DMRS patterns of antenna ports 9 and 10 occupy the resources shown in FIG. 5b. DMRS patterns of antenna ports 7 and 8 are code-division orthogonal. Similarly DMRS patterns of antenna ports 7, 8, 11, and 12 are code-division orthogonal while DMRS of antenna ports 9, 10, 13, and 14 are code-division orthogonal.

If two U-PDCCHs are spatially multiplexed, the DMRS antenna ports for the two U-PDCCHs should be different. In addition, the scrambling codes for the two U-PDCCHs should also be different to randomize the interference.

Usually a scrambling code can be applied on the encoded bits by modulo-2 addition (in binary field GF(2)) as in shown TS 36.211 Release-8 of 3GPP LTE specification, or a scrambling code can be applied onto the modulated symbols in a manner similar to that in code division multiple access (CDMA) systems.

Signaling by the eNB may be used to indicate which scrambling code and/or which antenna port for DMRS is used for the U-PDCCH of a UE. As an example, UE1 has a scrambling code and/or an antenna port of DMRS, but UE2 has another scrambling code and/or another antenna port for DMRS. Then UE1 and UE2 may be spatially multiplexed at the same resource depending on channel conditions. In general, UEs with the same scrambling code and/or antenna port of DMRS should not be spatially multiplexed. In other words, one UE may be paired with another UE for spatial multiplexing of U-PDCCH if the two UEs have different scrambling codes and/or antenna ports of DMRS configurations. This may be a constraint on spatial multiplexing of U-PDCCH of multiple UEs.

With U-PDCCH spatial multiplexing, the capacity of U-PDCCH may be increased. However, it is possible that the U-PDCCH may not fully occupy the available REs in a RB if a low aggregation level (e.g., L=1) is applied, or fully occupy the second slot of a RB pair if there is no U-PDCCH in the second slot of the RB pair. The remaining REs (the unoccupied REs) may be allocated to one of UEs which has a U-PDCCH allocated in the first slot of the RB pair, or the remaining REs may be allocated to a UE without a U-PDCCH in the RB pair if the UE knows which REs have been allocated to U-PDCCH.

It may be possible to provide a performance improvement over an R-PDCCH as well, where the R-PDCCH and a PDSCH can share DMRS of antenna port 7. The techniques presented herein show how to use and assign DMRS for the U-PDCCH and PDSCH. To ensure remaining REs may be allocated to PDSCH of a UE, a set of DMRS patterns different from the set of DMRS patterns for U-PDCCH should be allocated to the UE depending on the layers in the spatial domain for data channel.

From the UE perspective, the UE (e.g., UE1) may be unaware if another UE's (e.g., UE2) U-PDCCH is multiplexed in the same resource as its own U-PDCCH. Therefore, the UE1 may be unaware which DMRS patterns were allocated to the UE2's U-PDCCH.

Figure 6:
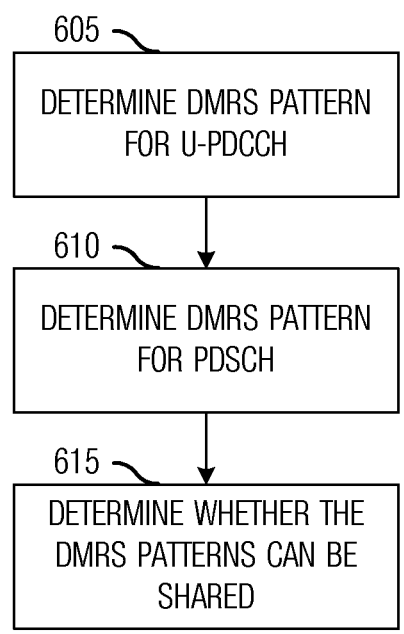
FIG. 6 illustrates an example flow diagram of eNB operations in DMRS pattern selection for U-PDCCH and PDSCH multiplexing according to example embodiments described herein.

FIG. 6 illustrates a flow diagram of eNB operations in DMRS pattern selection for U-PDCCH and PDSCH multiplexing. eNB operations may be indicative of operations occurring in an eNB, such as eNB 105, as the eNB selects DMRS patterns for a U-PDCCH and a PDSCH that are to be multiplexed.

eNB operations may begin with the eNB determining (or scheduling) by computing, decoding, receiving, retrieving, and the like, information about antenna ports for a U-PDCCH (block 605) and a PDSCH (block 610) to ensure that the DMRS patterns for the U-PDCCH and the PDSCH of a UE will not collide another UE's DMRS patterns for its U-PDCCH (block 615). It is noted that when two UEs have different antenna port allocations for their respective U-PDCCH, the antenna port allocations may also be used for the UEs PDSCHs. As an example, considering a situation where there are a total of 4 transmission antenna ports (e.g., 7, 8, 9, and 10), then the DMRS of antenna ports 9 and 10 may be allocated for the U-PDCCHs of two UEs (such as UE1 and UE2). Additionally, antenna port(s) 7 and/or 8 of DMRS may be allocated for a PDSCH of a UE (such as UE1).

As an example, if UE1 has the antenna port 9 of DMRS for U-PDCCH and antenna port(s) 7 and/or 8 for PDSCH, antenna port 9 of DMRS may also be reused for PDSCH. Hence antenna ports 7 and/or 8 and 9 may be used for PDSCH to support more spatial multiplexing layers for UE1. Generally, if the control signaling of U-PDCCH indicates that the antenna port of DMRS is to be used for U-PDCCH is also used for PDSCH demodulation, then the PDSCH can share the DMRS of U-PDCCH. As another example, the PDSCH may share the DMRS of U-PDCCH if U-PDCCH and PDSCH are in a same RB pair as indicated by block 615. For example, if antenna ports 7 and 8 of DMRS are signaled for PDSCH in the U-PDCCH and antenna port 10 of DMRS is used for U-PDCCH, a technique may be defined so that antenna port 7 (or 8) is replaced by antenna 10 in the RB pair with U-PDCCH and PDSCH. Hence in this RB pair antenna ports 10 and 8 (or 7) are used for PDSCH.

Although the discussion of FIG. 6 focuses on the selection of DMRS patterns for multiplexing a U-PDCCH and a PDSCH, other control channels may also be multiplexed together. As an example, a U-PDCCH may be multiplexed with another U-PDCCH, a U-PDCCH may be multiplexed with a R-PDCCH, a PDSCH may be multiplexed with a R-PDCCH, two R-PDCCHs may be multiplexed, and the like. Therefore, the discussion of multiplexing a U-PDCCH and a PDSCH should not be construed as being limiting to either the scope or the spirit of the examples disclosed herein.

In general, the U-PDCCH may not always use antenna port 7 of DMRS for channel estimation. Another antenna port of DMRS may be allocated for channel estimation. The antenna port information can be provided using signaling or some predefined rule, for example, determined using a function of a UE identifier, such as, a UE-ID.

A procedure may be defined to share an antenna port of DMRS for PDSCH and U-PDCCH. As an example, a signaled antenna port of DMRS for PDSCH may be replaced by an antenna port of DMRS for U-PDCCH. As another example, signaled antenna ports of DMRS for PDSCH may include an antenna port of DMRS for U-PDCCH. For example, the signaling may indicate contiguously indexed antenna ports of DMRS for PDSCH for a UE, but the starting index may be the same as the antenna port of DMRS for U-PDCCH of this UE.

As an illustrative example, signaling may indicate four antenna ports of DMRS are provided for PDSCH, and the index of antenna port of DMRS of U-PDCCH is 8, therefore, ports 8, 9, 10, and 11 are the antenna ports provided for PDSCH transmission. With this procedure, UEs with different antenna ports of DMRS for U-PDCCH and PDSCH may be spatially multiplexed. As an example, UE1 has antenna port 7 of DMRS for U-PDCCH while UE2 has antenna port 9 of DMRS for U-PDDCH. If signaling indicates there are two antenna ports of DMRS for PDSCH of UE1, then antenna ports 7 and 8 of DMRS are allocated to PDSCH of UE1. Similarly, if signaling indicates that UE2 has two antenna ports of DMRS for PDSCH, then antenna ports 9 and 10 of DMRS are allocated to UE2 for PDSCH.

Another method that may be used to multiplex U-PDCCH for two UEs is to signal a set of scrambling codes and/or antenna ports of DMRS. With this method, the flexibility of pairing for U-PDCCHs of different UEs may be increased at the cost of increasing number of blind decoding since the UE may need to blindly detect which scrambling code and/or antenna port of DMRS is used for its U-PDCCH. If the number of U-PDCCH candidates with different resource allocations is kept the same, the total number of blind decoding would be doubled with dual scrambling codes and/or dual antenna ports of DMRS. In order to maintain the same number of blind decodings performed by the UE, the resource allocation for U-PDCCH candidates of a UE may be reduced by one half. Resulting in a reduction in the number of candidates in time-frequency domain, which may result in more allocation collisions for U-PDCCH. In other words, blocking probability may increase.

One solution to reduce blind decoding by the UE is to pseudo-randomly assign scrambling code and/or antenna port(s) of DMRS. For U-PDCCH, a UE-specific pseudo random sequence such as a Gold sequence may be used to select scrambling code and/or antenna ports of DMRS. The total number of scrambling codes and/or antenna ports of DMRS that can be used for this UE may be predetermined and signaled to UE, or predefined in a technical or industrial standard.

From the set of scrambling code and/or antenna ports of DMRS, randomly selecting a scrambling code and/or antenna port of DMRS (e.g., using a pseudo random sequence) for a UE can be based on a specific time interval, such as a subframe, a specified number of subframes, a frame, a specified number of frames, and the like. The eNB may transmit the U-PDCCH with UE-specific scrambling code and/or antenna port of DMRS. If the UE detects (e.g., through blind detection) one scrambling code and/or one antenna port of DMRS, the total number of blind detection attempts is not increased.

At another time interval, such as a different subframe, a UE may be paired with different UEs to increase the flexibility of spatial multiplexing. For discussion purposes, assuming that there are two scrambling codes and/or antenna ports of DMRS for selection, a portion, such as a bit, of the pseudo random sequence may indicate one of two candidates, for example, a "0" may indicate the first UE, and a "1"

may indicate the second UE. Generally, one may use n bits from the pseudo random sequence to select one of m options. A formula such as $$b \bmod m,$$

where b is a non-negative integer less than $2^n$, may be used to determine what to blind decode. The value b, which may be UE dependent, the value n (a number of bits from a pseudo random sequence) and the number of options m, which can indicate the total number of scrambling codes and/or antenna ports allocated for a UE, may be signaled to a UE by UE-dedicated signaling or broadcast signaling.

While signaling may indicate a set of scrambling codes and/or a set of DMRS patterns, a subset of DMRS patterns may be allocated. As an example, if antenna ports 7 and 8 are signaled to be used for DMRS of a UE, then the REs for pattern 9 and 10 may be reserved for data transmission, or the patterns 9 and 10 can be for DMRS of data channel.

Figure 7A:
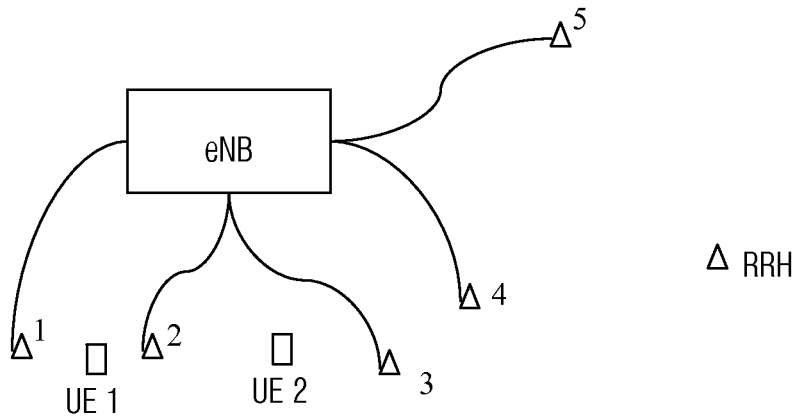
FIGS. 7a and 7b illustrate example communications systems according to example embodiments described herein.
Figure 7B:
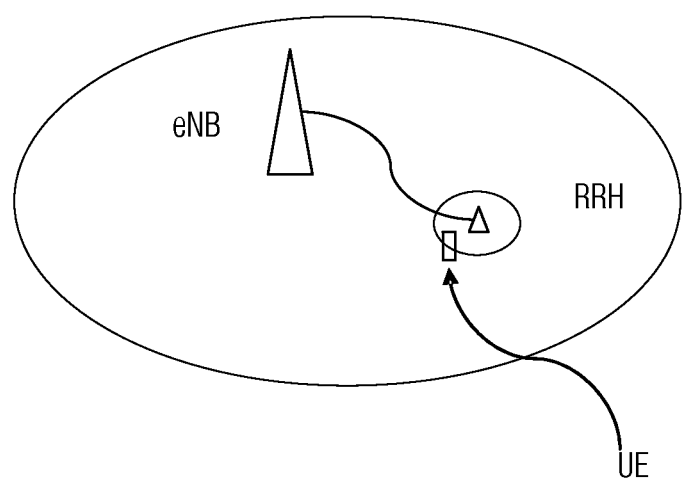

FIGS. 7a and 7b illustrate example communications systems. As shown in FIGS. 7a and 7b, the communications systems may use the same cell-id for multiple remote radio heads (RRHs) or may use different cell-id for multiple RRHs. The scrambling code used for U-PDCCH may correspond to an identifier, such as a cell-identifier (cell-id), a cell group identifier, a site group identifier, a site identifier, and the like. There may be multiple scrambling codes corresponding to antenna ports. The scrambling code for an antenna port may be determined by the cell-id and the antenna port index together.

As an example, the signaling may convey a set of scrambling codes used for U-PDCCH modulation. As another example, the signaling may convey a set of DMRS patterns. Typically, the set of DMRS patterns may be orthogonal, or the set of DMRS patterns may be divided into multiple subsets and within each subset, the DMRS patterns may be orthogonal.

As an example, the signaling may be provided using broadcast signaling or dedicated signaling. With dedicated signaling, each UE may have a unique scrambling code(s) and/or DMRS pattern(s). Even though the scrambling codes may be cell-specific, for example, there can be a set of scrambling codes in a cell where each UE in the cell may be assigned unique scrambling code(s) selected from the set of scrambling codes.

With DMRS, if two DMRS patterns are code-division orthogonal, for example, by using different time domain Walsh covering codes, the scrambling codes may be the same. Different scrambling codes may be used for generating more DMRS patterns in addition to orthogonal codes. For example, with two different scrambling codes, there may be 16 DMRS patterns. Signaling may be used to inform UEs about a scrambling code used for DMRS.

Typically, a transmission method for U-PDCCH, which has a characteristic that a reference signal that corresponds to the U-PDCCH is transmitted, is used. The reference signal may be used for demodulation of the U-PDCCH by the UE. The reference signal may be determined by a reference signal pattern. As an example, considering a situation where there are 8 DMRS patterns as described above, and one pattern out of the 8 patterns may be transmitted for the U-PDCCH. The pattern that is transmitted for the U-PDCCH may be determined by a pseudo-random sequence. The generation of the pseudo-random sequence can be initialized using a seed. As an example, the seed may be based on a UE-specific parameter, such as a UE identifier (UE-ID). As another example, the seed may be a cell-specific parameter. As another example, the seed may be based on a combination of the UE-ID and cell-ID. For each subframe, slot, RB, and/or U-PDCCH candidate, a corresponding element in the pseudo-random sequence may be used for determining the DMRS pattern for subframe, slot, RB, and/or U-PDCCH candidate.

The pseudo-random sequence may vary depending on the subframe, slot, RB, and/or U-PDCCH candidates. Due to UE complexity reasons, the same element in the pseudo-random sequence may be used for different U-PDCCH candidates for a given subframe and/or slot. As an example, the candidates of U-PDCCH for a UE in a subframe may all have the same reference signal pattern.

As an example, a signaling technique having a characteristic that the signaling may inform a UE about a set of reference signal patterns for each subframe and/or slot, and/or for each U-PDCCH, according to a pseudo-random sequence. A reference sequence pattern corresponding to an element of the pseudo-random sequence may be used for the U-PDCCH, or a set of reference sequence patterns may be predefined in a technical specification.

At a UE, a reception technique of U-PDCCH, where the UE detects all the candidates of U-PDCCH for this UE. As an example, the UE may detect a plurality of candidates corresponding to a plurality of different aggregation levels (which corresponds to the numbers of REs for U-PDCCH), a plurality of candidates corresponding to different DCI formats, a plurality of candidates corresponding to different resource allocations for U-PDCCH, and the like. The reception technique may be characterized by a reference signal from a set of reference patterns that is used for demodulation of a U-PDCCH candidate according to a pseudo-random sequence.

Figure 8A:
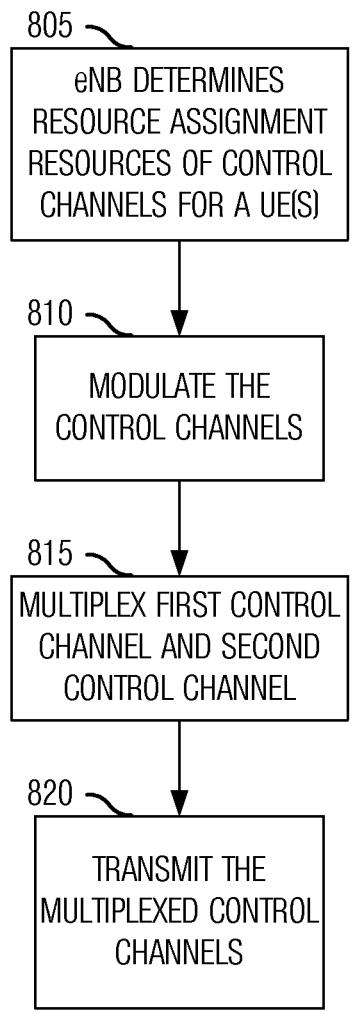
FIG. 8a illustrates an example flow diagram of eNB operations in transmitting a first control channel (e.g., a U-PDCCH) and a second channel (e.g., a PDSCH) according to example embodiments described herein.

FIG. 8a illustrates a flow diagram of eNB operations in transmitting a first control channel (e.g., a U-PDCCH) and a second channel (e.g., a PDSCH). eNB operations may be indicative of operations occurring in an eNB, such as eNB 105, as the eNB transmits a first control channel and a second channel.

Generally, a transmission technique used for transmitting a U-PDCCH, which has the characteristic that a scrambling code sequence corresponding to a U-PDCCH is used for U-PDCCH transmission. There may be a plurality of scrambling code sequences, and the scrambling code sequence may be from the set of scrambling code sequences associated with a UE. Which scrambling code sequence is used out of the set of scrambling code sequences may be determined by a pseudo-random sequence. The pseudo-random sequence may be controlled (seeded) by UE-ID and/or cell-ID, and the like. The UE-ID and/or the cell ID, and the like, may be shared with the UE. In general, the scrambling code sequence applied for U-PDCCH can correspond to a reference signal pattern for the U-PDCCH. In other words, there may be a one-one corresponding relationship between scrambling code sequences and reference signal patterns for U-PDCCH.

eNB operations may begin with the eNB determining resource assignment parameters, e.g., DMRS, reference signals, antenna ports, antenna port numbers, precoding vectors, orthogonal patterns, scrambling codes, and the like, for the first control channel (e.g., the U-PDCCH) and as well as the resource assignment parameters for the second channel (e.g., the PDSCH) to be transmitted to a UE(s) (block 805). The eNB may determine the resource assignment parameters of the first control channel and the second channel using a pseudo-random sequence, such as a scrambling code, associated with the UE(s). The pseudo-random sequence may be generated using a sequence generator.

The sequence generator may be initialized according to an identifier associated with the UE. As an example, a cell specific identifier may be used to initialize the sequence generator. In such a scenario, UEs in a cell may utilize the same resource assignment parameter(s). As another example, a UE specific identifier may be used to initialize the sequence generator. In such a scenario, different UEs within a cell may utilize different resource assignment parameter(s). As another example, a combination of a UE specific identifier and a cell specific identifier may be used to initialize the sequence generator. The UE specific identifier and/or the cell specific identifier may be shared with the UE. Additionally, a different sequence generator may be used for different UEs, a group of UEs may use the same sequence generator, UEs operating in a single cell may use the same sequence generator, and the like. If there are multiple UEs, the eNB may repeat block 805 for each of the multiple UEs.

The eNB may modulate control information for the first control channel and the second channel for the UE(s) (block 810). If there are multiple UEs, the eNB may multiplex the modulated control information for the first control channel and the modulated control information for the second channel for several UEs into a resource, such as a RB or a RB pair, of a subframe according to the resource assignment parameters (block 815). The eNB may transmit the subframe including the multiplexed first control channel and the multiplexed second channel for the UE(s) (block 820).

As illustrative examples, the multiplexing of the first control channel and the second channel according to the resource assignment parameter may be as described below. If the resource assignment parameter comprises a DMRS or some other reference signal, the eNB may multiplex the modulated control information for the first control channel, the modulated control information for the second channel, a first DMRS determined for the first control channel, and a second DMRS determined for the second channel onto a RB or a RB pair. Similarly, if the resource assignment parameter comprises a precoding vector, the eNB may precode the modulated control information for the first control channel with a first precoding vector, precode the modulated control information for the second channel with a second precoding vector, and then multiplex the precoded, modulated control information for the first control channel and the precoded, modulated control information for the second channel. If the resource assignment parameter comprises an orthogonal pattern, then the eNB may operate in a manner similar to the above described process for the precoding vector, but instead of precoding the modulated control information, the eNB may multiply or add the orthogonal pattern with the modulated control information. It is noted that multiple resource assignment parameters may be combined together. As an example, a first example resource assignment parameter may comprise a precoding vector and a DMRS, while a second example resource assignment parameter may comprise an orthogonal vector and antenna ports.

Although the discussion of FIG. 8*a* focuses multiplexing the first control channel and the second channel of a single UE, UE operations may also be applied to a situation involving the multiplexing of a first control channel of a first UE and a second control channel (or a second channel) of a second UE. UE operations for multiplexing control channels for multiple UEs may begin with the eNB determining resource assignment parameters, e.g., DMRS, reference signals, antenna ports, precoding vectors, orthogonal patterns, and the like, for the first control channel of the first UE and for the second control channel of the second UE (block 805). As an example, the eNB may use a pseudo-random sequence, such as a scrambling code, associated with the first UE and the second UE to determine the respective resource assignment parameters.

The eNB may modulate the control information for the first control channel and the second control channel for the UEs (block 810). The eNB may multiplex the modulated control information for the first control channel and the modulated control information for the second control channel into a RB or a RB pair of a subframe according to the resource assignment parameters (block 815). It is noted that the multiplexing of the modulated control information according to the resource assignment parameter may proceed as discussed above. The eNB may transmit the subframe including the multiplexed first control channel and the multiplexed second control channel to the UEs (block 820).

Figures 8B, 8C:
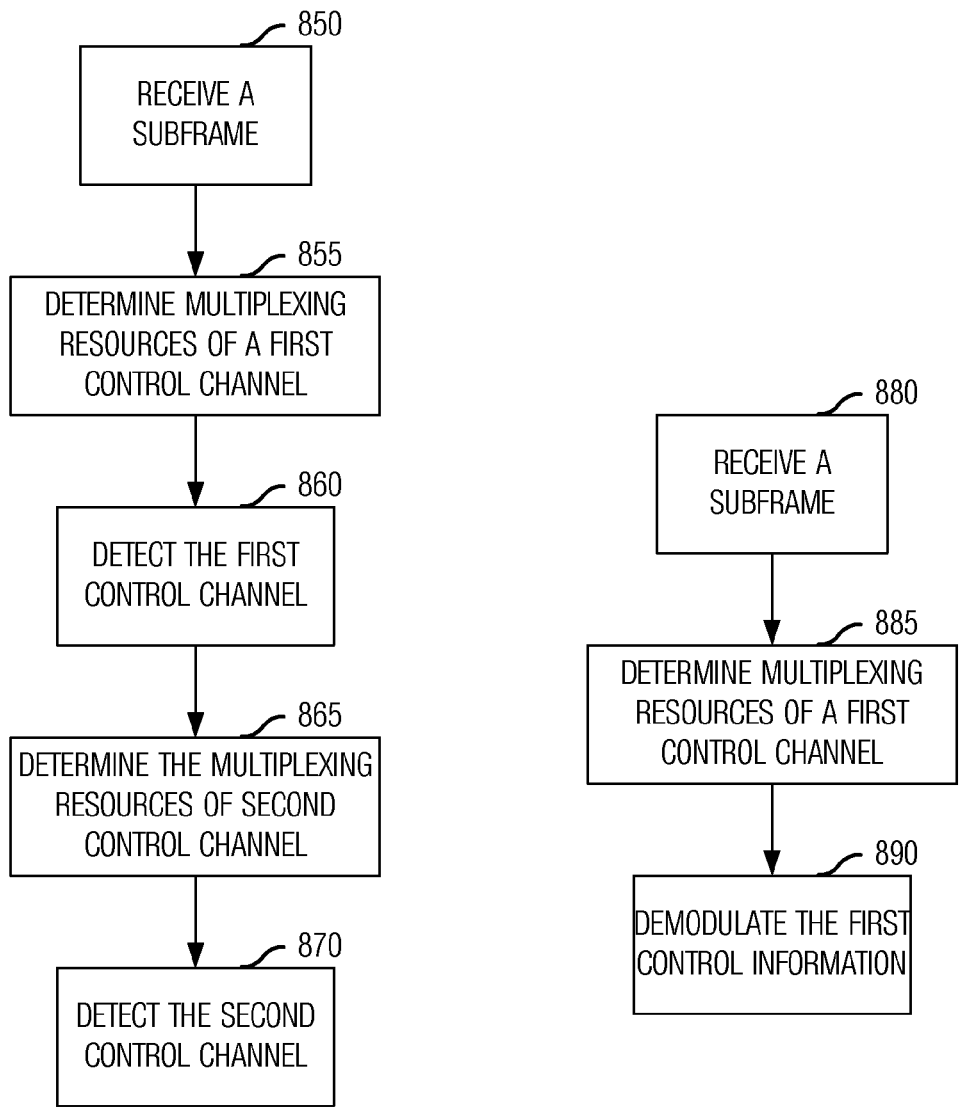
FIG. 8b illustrates a flow diagram of UE operations in receiving a first control channel (e.g., a U-PDCCH) and an example second channel (e.g., a PDSCH) according to example embodiments described herein.
FIG. 8c illustrates an example flow diagram of UE operations in receiving a first control channel multiplexed with a second control channel according to example embodiments described herein.

FIG. 8*b* illustrates a flow diagram of UE operations in receiving a first control channel (e.g., a U-PDCCH) and a second channel (e.g., a PDSCH). UE operations may be indicative of operations occurring in a UE, such as UE 110 and UE 120, as the UE receives a first control channel and a second channel.

Typically, a reception method of the first control channel, e.g., the U-PDCCH, may be characterized by a scrambling code sequence applied to a candidate of the first control channel, e.g., the U-PDCCH, where the scrambling code is selected from a set of scrambling code sequences. The scrambling code sequence used may be determined by a pseudo-random sequence. The pseudo-random sequence may be controlled (seeded) by parameters such as UE-ID and/or cell-ID, and the like. A shared antenna port of DMRS, which may be shared by a U-PDCCH and PDSCH in a RB or RB pair, may be signaled to the UE (or determined by the UE according to a predefined technique using a parameter, such as UE-ID).

UE operations may begin with the UE receiving a subframe (block 850). As an example, the subframe may include a control channel for the UE. The UE may determine resource assignment parameters, e.g., DMRS, reference signals, antenna ports, precoding vectors, orthogonal patterns, and the like, for the first control channel (block 855). As discussed previously, the UE may determine the resource assignment parameters for the first control channel through signaling provided by the eNB or through the use of a pseudo-random sequence generated by a sequence generator that may be initialized (seeded) by an identifier such as UE-ID and/or cell-ID, and the like. The UE may use the resource assignment parameters of the first control channel to assist in detecting the first control channel (block 860).

The UE may determine the resource assignment parameters for the second control channel (block 865). As discussed previously, the UE may determine the resource assignment parameters of the second channel through signaling provided by the eNB or through the use of a pseudo-random sequence generated by a sequence generator that may be initialized (seeded) by parameters such as UE-ID and/or cell-ID, and the like. In some instances, the resource assignment parameters for the second channel may be the same or a subset of the resource assignment parameters for the first control channel. As an example, the resource assignment parameters, such as DMRS (e.g., the antenna ports of the DMRS) of the second channel may be determined from the resource assignment parameters, such as DMRS (e.g., an index of antenna ports of the DMRS) of the first control channel or signaling in the first control channel. In some other instances, an antenna port(s) shared by the first control channel and the second channel may be signaled to the UE, for example, using higher layer signaling or Layer One and/or Layer Two signaling. The UE may use the resource assignment parameters of the second channel to detect the PDSCH (block 870).

As illustrative examples, the detecting of the first control channel using resource assignment parameters and the detecting of the second channel using resource assignment parameters may be as described below. If the resource assignment parameter comprises a DMRS or some other reference signal, the UE may utilize its knowledge of the DMRS or some other reference signal to assist in detecting the multiplexed first control channel and/or the multiplexed second channel. If the resource assignment parameter comprises a precoding vector, the UE may apply a precoding vector for the first control channel to its receive antenna array prior to receiving the first control channel. The UE may also apply a precoding vector for the second channel to its receive antenna array prior to receiving the second control channel. It is noted that multiple resource assignment parameters may be combined together.

FIG. 8c illustrates a flow diagram of UE operations in receiving a first control channel multiplexed with a second control channel. UE operations may be indicative of operations occurring in a UE, such as UE 110 and UE 120, as the UE receives a first control channel that has been multiplexed with a second control channel.

UE operations may begin with the UE receiving a subframe (block 880). As an example, the subframe may include a control channel for the UE. The UE may determine resource assignment parameters, e.g., DMRS, reference signals, antenna ports, precoding vectors, orthogonal patterns, and the like, for the first control channel (block 885). As discussed previously, the UE may determine the resource assignment parameters for the first control channel through signaling provided by the eNB or through the use of a pseudo-random sequence controlled (seeded) by parameters such as UE-ID and/or cell-ID, and the like. The UE may use the resource assignment parameters of the U-PDCCH to assist in demodulating the control information from the U-PDCCH (block 890).

As an alternative example, a reception method of U-PDCCH and PDSCH, which has the characteristic that determining an antenna port of DMRS for U-PDCCH, and determining an antenna port of DMRS for PDSCH in the same RB pair as for U-PDCCH, and the antenna port of DMRS for U-PDCCH is shared with PDSCH, uses the DMRS for channel estimation of U-PDCCH and PDSCH, as well as demodulation and decoding of U-PDCCH and PDSCH. The antenna port of DMRS for U-PDCCH may be determined through decoding signaling transmitted by eNB or through a randomization scheme utilizing a pseudo-random sequence. The antenna ports of DMRS for PDSCH may be determined by contiguous indices with the index of the antenna port of DMRS for U-PDCCH being a starting antenna port.

Figure 9A:
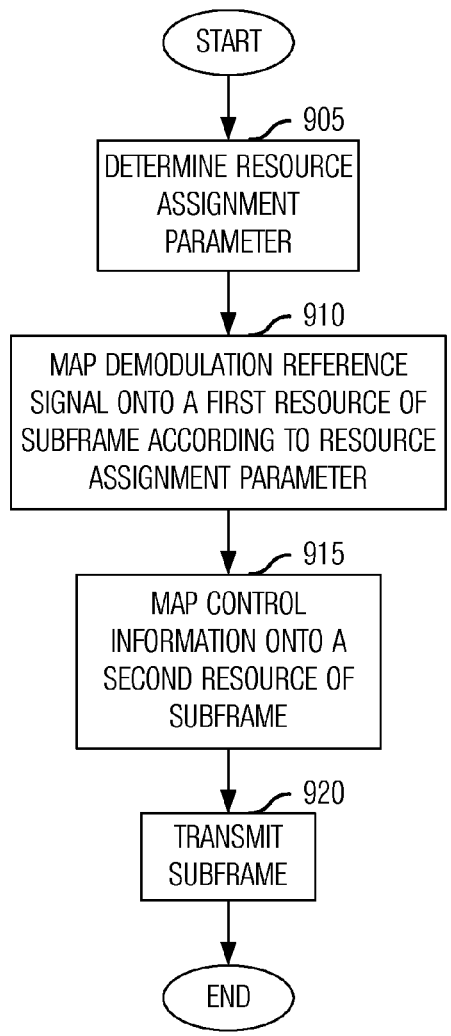
FIG. 9a illustrates an example flow diagram of eNB operations in transmitting a control channel with an associated reference signal according to example embodiments described herein.

FIG. 9a illustrates a flow diagram of eNB operations in transmitting a control channel with an associated reference signal. eNB operations may be indicative of operations occurring in an eNB, such as eNB 105, as the eNB transmits a control channel with an associated reference signal, e.g., a DMRS.

eNB operations may begin with the eNB determining a resource assignment parameter, such as a DMRS, a reference signal, and the like, for the control channel (block 905). In general, the eNB may determine some or all of the resource assignment parameters of the control channel using a pseudo-random sequence, such as a scrambling code, associated with the UE(s). The pseudo-random sequence may be generated using a sequence generator.

The eNB may map a DMRS, to be used to assist the UE in demodulating the control channel, onto a first resource or first resources of a subframe, e.g., a data region of the subframe (block 910). The DMRS used may be selected according to the resource assignment parameter or may be based on the resource assignment parameter. As an example, the resource assignment parameter may be an index of a DMRS selected out of a set of DRMSs. As an example, the resource assignment parameter may be a reference sequence that may be used as the DMRS.

The eNB may map modulated control information onto a second resource or second resources of the subframe, e.g., the data region of the subframe (block 915). It is noted that the modulated control information and the DMRS may be associated with an antenna port. The eNB may transmit the subframe to the UE (block 920).

As an example, in the 3GPP LTE Release-10 technical standards, a general structure for a DL channel has steps of precoding complex-valued modulation symbols on each layer for transmission on the antenna ports to resources, e.g., REs. Additionally, UE specific reference signals, such as DMRS, may be transmitted only on resources, e.g., RBs, upon which corresponding PDSCH are mapped.

However, in the examples discussed herein, DMRS may be transmitted on resources, e.g., RBs, upon which the U-PDCCH are mapped. A precoding vector that is used for the U-PDCCH may also be used for the DMRS. The precoding vector may be said to be associated with the DMRS and the U-PDCCH. During demodulation, the UE may use the DMRS for wireless channel estimation, which may then be used to demodulate the received U-PDCCH.

Figure 9B:
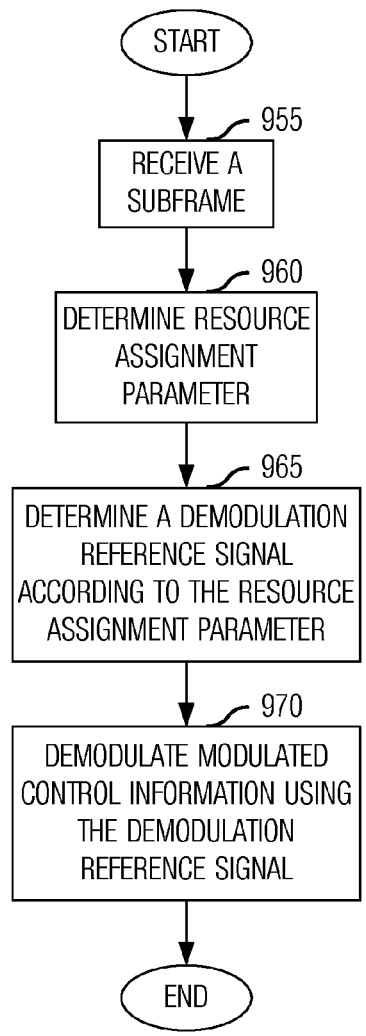
FIG. 9b illustrates an example flow diagram of UE operations in receiving a control channel with an associated reference signal according to example embodiments described herein.

FIG. 9b illustrates a flow diagram of UE operations in receiving a control channel with an associated reference signal. UE operations may be indicative of operations occurring in a UE, such as UE 110 and UE 120, as the UE receives a control channel with an associated reference signal.

UE operations may begin with the UE receiving a subframe (block 955). The UE may determine a resource assignment parameter, such as a DMRS, a reference signal, and the like, for the control channel (block 960). In general, the UE may determine some or all of the resource assignment parameters of the control channel using a pseudo-random sequence, such as a scrambling code, associated with the UE. The pseudo-random sequence may be generated using a sequence generator.

The UE may determine a DMRS according to the resource assignment parameter (block 965). As an example, the resource assignment parameter may be an index of a DMRS selected out of a set of DRMSs. As an example, the resource assignment parameter may be a reference sequence that may be used as the DMRS. The UE may demodulate the modulated control information in the control channel using the DMRS to produce the control information (block 970).

Figure 10:
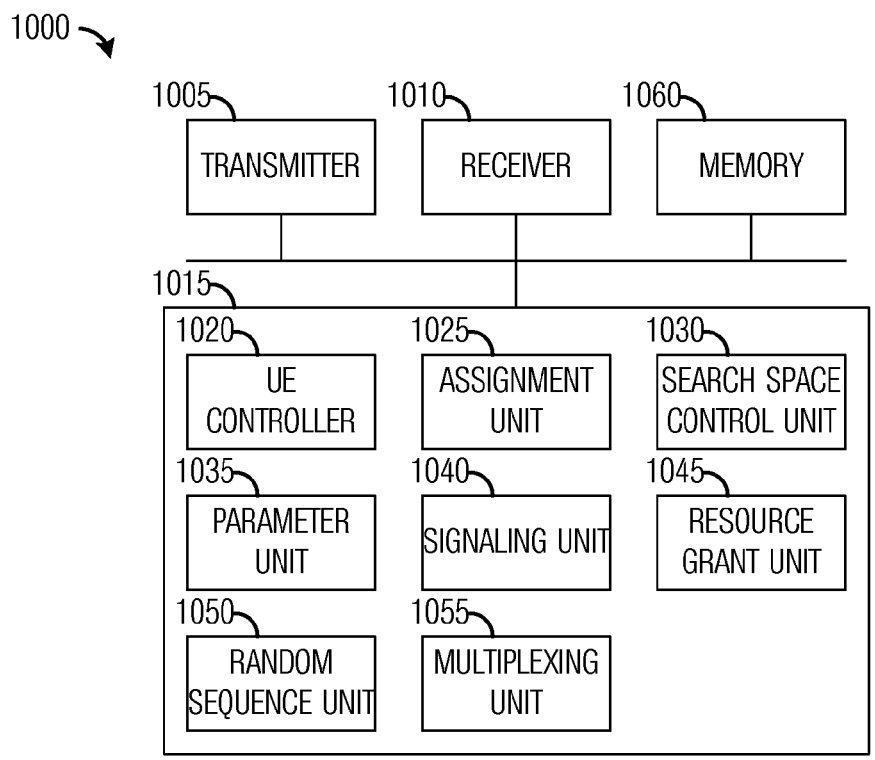
FIG. 10 illustrates an example first communications device according to example embodiments described herein.

FIG. 10 illustrates a first communications device 1000. Communications device 1000 may be used to implement various ones of the embodiments discussed herein. As shown in FIG. 10, a transmitter 1005 is configured to transmit information and a receiver 1010 is configured to receive information.

A UE controller 1020 is configured to determine which control channel(s) a UE is to monitor. The determination may be based on a number of factors, such as UE capability, communications system capability, and so on. An assignment unit 1025 is configured to assign a UE to monitor a control channel(s). For example, assignment unit 1025 may assign a UE to monitor a PDCCH, a U-PDCCH, or both PDCCH and U-PDCCH. A search space controller 1030 is configured to specify a search space or a set of search spaces (possibly out of a number of possible search spaces) where a UE may search to find a U-PDCCH. A parameter unit 1035 is configured to select and/or assign communications parameters, such as rank, coding rate, modulation scheme, antenna port, and so forth, to a UE. A signaling unit 1040 is configured to generate messages and/or indications to be transmitted to a UE, where the messages and/or indications convey channel assignments, parameters, and so on. A resource grant unit 1045 is configured to grant resources to UEs. A random sequence unit 1050 is configured to generate a pseudo-random number according to a pseudo-random number sequence and an initialization value (e.g., a seed). Random sequence unit 1050 may be implemented as a sequence generator. A multiplexing unit 1055 is configured to select a resource assignment parameter, e.g., DMRS, reference signals, antenna ports, precoding vectors, orthogonal patterns, and the like, according to the pseudo-random number sequence. Multiplexing unit 1055 is also configured to multiplex information onto resource elements according to the resource assignment parameter. A memory 1060 is configured to store information, such as channel assignment, parameters, pseudo-random sequences, seeds, resource assignment parameters, etc.

The elements of communications device 1000 may be implemented as specific hardware logic blocks. In an alternative, the elements of communications device 1000 may be implemented as software executing in a processing unit such as processor (e.g., microprocessor or digital signal processor), controller, application specific integrated circuit, or so on. In yet another alternative, the elements of communications device 1000 may be implemented as a combination of software and/or hardware.

As an example, transmitter 1005 and receiver 1010 may be implemented as a specific hardware block, while UE controller 1020, assignment unit 1025, search space controller 1030, parameter unit 1035, signaling unit 1040, resource grant unit 1045, random sequence unit 1050, and multiplexing unit 1055 may be software modules executing in a microprocessor, such as processor 1015, or a custom circuit or a custom compiled logic array of a field programmable logic array.

Figure 11:
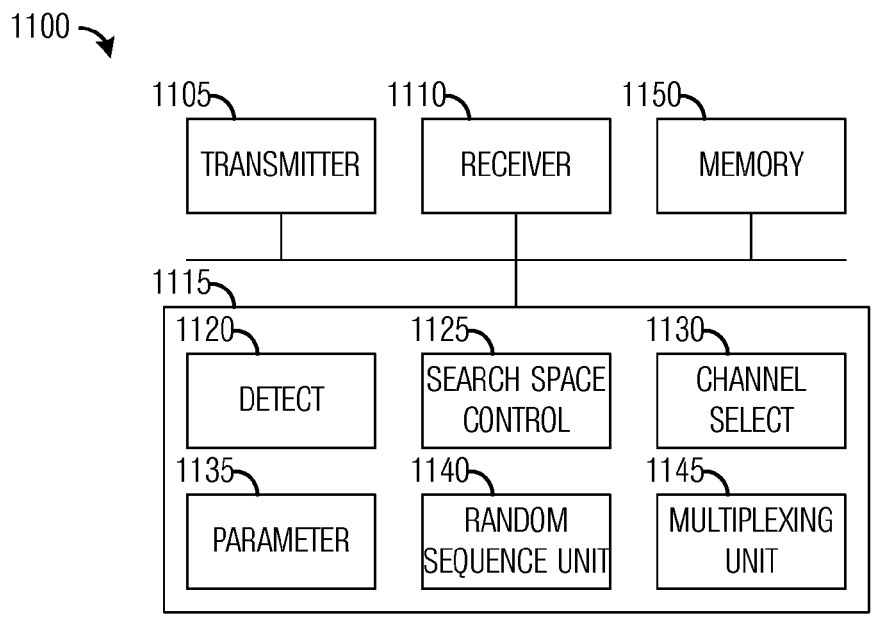
FIG. 11 illustrates an example second communications device according to example embodiments described herein.

FIG. 11 illustrates a second communications device 1100. Communications device 1100 may be used to implement various ones of the embodiments discussed herein. As shown in FIG. 11, a transmitter 1105 is configured to transmit information and a receiver 1110 is configured to receive information.

A detector 1120 is configured to detect transmissions by searching (e.g., by blind detection) a search space for the transmissions. A search space controller 1125 is configured to control the searches made by communications device 1100 based on search space(s) specified by an eNB controlling the communications device 1100. A channel select unit 1130 is configured to select a control channel to monitor based on instructions from the eNB, power measurements, performance metrics, and so on. A parameter unit 1135 is configured to process communications parameters provided by the eNB. A random sequence unit 1140 is configured to generate a pseudo-random number according to a pseudo-random number sequence and an initialization value (e.g., a seed). A multiplexing unit 1145 is configured to demultiplex information from resource elements according to a resource assignment parameter, e.g., DMRS, reference signals, antenna ports, precoding vectors, orthogonal patterns, and the like, according to the pseudo-random number. A memory 1150 is configured to store information, such as channel assignment, parameters, pseudo-random sequences, seeds, resource assignment parameters, etc.

The elements of communications device 1100 may be implemented as specific hardware logic blocks. In an alternative, the elements of communications device 1100 may be implemented as software executing in a processing unit such as processor (e.g., microprocessor or digital signal processor), controller, application specific integrated circuit, or so on. In yet another alternative, the elements of communications device 1100 may be implemented as a combination of software and/or hardware.

As an example, transmitter 1105 and receiver 1120 may be implemented as a specific hardware block, while detector 1120, search space controller 1125, channel select unit 1130, parameter unit 1135, random sequence unit 1140, and multiplexing unit 1145 may be software modules executing in a microprocessor or a custom circuit or a custom compiled logic array of a field programmable logic array.

Although the present disclosure and its advantages have been described in detail, it should be understood that various changes, substitutions and alterations can be made herein without departing from the spirit and scope of the disclosure as defined by the appended claims.

What is claimed is:

1. A method for communicating with a non-relay wireless node, the method comprising:
   selecting, by a communications controller, between a control region and a data region of a subframe for mapping of modulated control information for the non-relay wireless node;
   determining, by the communications controller in response to the data region being selected, a first resource assignment parameter derived from an identifier;
   transmitting, by the communications controller to the non-relay wireless node, configuration information including first information indicating the data region of the subframe is used for the modulated control information for the non-relay wireless node, wherein the modulated control information is scrambled in accordance with second information of the configuration information;
   generating, by the communications controller in accordance with the configuration information, a first wireless node-specific demodulation reference signal sequence for demodulating the modulated control information for the non-relay wireless node;
   mapping, by the communications controller in response to the data region being selected, using the first resource assignment parameter, the first wireless node-specific demodulation reference signal sequence for demodulating the modulated control information for the non-relay wireless node, onto a first resource located in the data region of the subframe;
   mapping, by the communications controller in response to the data region being selected, the modulated control information onto a second resource located in the data region of the subframe;
   mapping, by the communications controller, a second wireless node-specific demodulation reference signal sequence for demodulating data, onto a third resource located in the data region of the subframe, wherein the first wireless node-specific demodulation reference signal sequence is different from the second wireless node-specific demodulation reference signal sequence;

mapping, by the communications controller, the data onto a fourth resource located in the data region of the subframe; and transmitting, by the communications controller, the subframe to the non-relay wireless node.

2. The method of claim 1, further comprising associating the first wireless node-specific demodulation reference signal sequence and the modulated control information with an antenna port.

3. The method of claim 1, wherein the identifier comprises a communications controller specific parameter.

4. The method of claim 1, wherein the identifier comprises a wireless node specific parameter.

5. The method of claim 4, further comprising transmitting the wireless node specific parameter to the non-relay wireless node.

6. The method of claim 5, further comprising transmitting the wireless node specific parameter to the non-relay wireless node using higher layer signaling.

7. The method of claim 1, further comprising determining a second resource assignment parameter.

8. The method of claim 1, wherein the first resource assignment parameter determines the first wireless node-specific demodulation reference signal sequence.

9. The method of claim 1, wherein the first resource of the subframe comprises resource elements.

10. The method of claim 1, wherein the first resource of the subframe comprises resource blocks.

11. The method of claim 1, wherein the first resource of the subframe comprises a resource block pair.

12. A communications controller comprising:
a processor configured to:
select between a control region and a data region of a subframe for mapping of modulated control information for a non-relay wireless node;
determine, in response to the data region being selected, a first resource assignment parameter derived from an identifier,
transmit, to the non-relay wireless node, configuration information including first information indicating the data region of the subframe is used for the modulated control information for the non-relay wireless node, wherein the modulated control information is scrambled in accordance with second information of the configuration information;
generate, in accordance with the configuration information, a first wireless node-specific demodulation reference signal sequence for demodulating the modulated control information for the non-relay wireless node;
map, in response to the data region being selected, using the first resource assignment parameter, the first wireless node-specific demodulation reference signal sequence for demodulating the modulated control information for the non-relay wireless node, onto a first resource located in the data region of the subframe;
map, in response to the data region being selected, the modulated control information onto a second resource located in the data region of the subframe;
map a second wireless node-specific demodulation reference signal sequence for demodulating data, onto a third resource located in the data region of the subframe, wherein the first wireless node-specific demodulation reference signal sequence is different from the second wireless node-specific demodulation reference signal sequence;
map the data onto a fourth resource located in the data region of the subframe; and
a transmitter operatively coupled to the processor, the transmitter configured to transmit the subframe to the non-relay wireless node.

13. The communications controller of claim 12, wherein the processor is configured to associate the first wireless node-specific demodulation reference signal sequence and the modulated control information with an antenna port.

14. The communications controller of claim 12, wherein the identifier comprises a wireless node specific parameter, and wherein the transmitter is configured to transmit the wireless node specific parameter to the non-relay wireless node.

15. The communications controller of claim 14, wherein the transmitter is configured to transmit the wireless node specific parameter to the non-relay wireless node using higher layer signaling.

16. The communications controller of claim 13, wherein the antenna port is associated with the first resource assignment parameter.

17. The communications controller of claim 12, further comprising the processor configured to determine the first resource assignment parameter according to a pseudo-random sequence derived from the identifier.

18. The method of claim 2, wherein the antenna port is associated with the first resource assignment parameter.

19. The method of claim 1, further comprising determining the first resource assignment parameter according to a pseudo-random sequence derived from the identifier.

20. The method of claim 19, further comprising generating the pseudo-random sequence using a sequence generator.

21. The method of claim 20, further comprising initializing the sequence generator using the identifier.

22. The method of claim 19, further comprising determining a second resource assignment parameter according to the pseudo-random sequence.

23. The method of claim 22, further comprising mapping the modulated control information using the second resource assignment parameter.

24. The communications controller of claim 16, wherein the processor is configured to generate the pseudo-random sequence using a sequence generator.

25. The communications controller of claim 24, wherein the processor is configured to initialize the sequence generator using the identifier.

26. The communications controller of claim 17, wherein the processor is configured to determine a second resource assignment parameter according to the pseudo-random sequence.

27. The communications controller of claim 26, wherein the processor is configured to map the modulated control information using the second resource assignment parameter.

* * * * *